United States Patent [19]

Riebs

[11] 4,345,291

[45] Aug. 17, 1982

[54] AUTOMATIC SECTIONALIZING SYSTEM

[75] Inventor: Richard E. Riebs, Hales Corners, Wis.

[73] Assignee: RTE Corporation, Waukesha, Wis.

[21] Appl. No.: 142,433

[22] Filed: Apr. 21, 1980

[51] Int. Cl.³ .............................................. H02H 7/26
[52] U.S. Cl. ........................................ 361/68; 361/84
[58] Field of Search ................. 361/68, 66, 65, 64, 361/67, 69, 71, 72, 62, 63, 70; 324/52; 307/83, 85, 86

[56] References Cited

U.S. PATENT DOCUMENTS

| | | | |
|---|---|---|---|
| 2,137,865 | 11/1938 | Traver | 361/66 |
| 2,154,114 | 4/1939 | Sporn et al. | 361/66 |
| 2,313,118 | 3/1943 | Bergvall | 361/66 |
| 3,970,898 | 7/1976 | Baumann et al. | 361/68 |
| 4,223,365 | 9/1980 | Moran | 361/71 |

Primary Examiner—Patrick R. Salce
Attorney, Agent, or Firm—Ronald E. Barry; Raymond E. Fritz, Jr.

[57] ABSTRACT

This invention relates generally to underground electric power distribution systems. In particular, it relates to underground loop feed circuits which include reclosers and transformers and a plurality of high frequency actuated normally closed isolator switches for automatically locating and sectionalizing portions of the loop circuit in which faults originate. The actuator switches between which a fault occurs are armed in response to a fault current and only those switches which are armed are opened thereby isolating the faulted section of cable. The remaining actuator switches remain closed.

20 Claims, 8 Drawing Figures (NORMAL)

(FAULT, ARMED)

(TRIPPED OPEN)

(FAULT, NOT ARMED)

AUTOMATIC SECTIONALIZING SYSTEM

BACKGROUND OF THE INVENTION

In some prior art underground electrical distribution systems, above-ground AC feeder cables are connected to a suitable single or multi-phase AC power source to supply opposite ends of an underground loop feed circuit. In some prior art systems, reclosers are provided to detect a fault in the loop and to open the loop circuit and thereby de-energize the entire loop. All transformer assemblies therein are de-energized until the fault either corrects itself or is located and corrected by service personnel. Location and correction of a fault is time consuming and costly and results in an undesirable power outage for utility customers served by transformers in the faulted loop. Various prior art approaches have been proposed to locate and/or overcome the fault conditions.

SUMMARY OF THE INVENTION

The present invention provides improved means for locating, sectionalizing and identifying the position of faults occurring in underground loop feed electrical power distribution systems. The invention contemplates an underground closed or open loop circuit which is energizable at opposite ends from one or more AC power sources. The loop circuit includes an underground shielded cable having a series-connected underground recloser switch at each end and one or more underground transformer assemblies connected to the cable between the pair of recloser switches so that each transformer assembly is normally energizable from the AC source through both recloser switches.

In the broadest aspect of the invention there are provided normally closed isolating switches connected in series in the cable between the recloser switches. High frequency transmitter/receiver units are used to sense fault currents on the cable and to apply high frequency control signals to the shielded cable. The high frequency control signal from each T/R unit being restricted to the adjacent cable sections by "traps" in the form of inductive coils connected in series in the cable. The T/R units responding to the absence of a control signal from an adjacent cable section to "arm" the isolating switch actuators for the isolating switches on each end of the cable section, the armed switch actuators opening the corresponding isolating switch after the reclosers at the end of the loop open in response to the same fault. On reclosing of the reclosers the faulted cable section will be isolated from the loop.

Apparatus in accordance with the invention offers numerous other advantages over the prior art. For example, it facilitates location of the faulted section of the loop circuit, thereby greatly reducing the repair time and cost for the utility providing the service. The apparatus can be used with either single phase or multi-phase power systems and can be applied to closed loop or open loop systems. Furthermore, since the underground assemblies and associated cables are shielded, the cables serve as effective communication lines for the high frequency control signals and there is no leakage of radio interference signals from the system. The apparatus is relatively economical to manufacture and install and can be installed in the factory or as a retro-fit to systems already in the field. Other objects and advantages will hereinafter appear.

DESCRIPTION OF THE DRAWINGS

FIG. 1 is a schematic diagram of an electrical power distribution system including a feeder cable and an underground closed loop circuit having opposite ends connected thereto and including a pair of reclosers with transformer assemblies connected there between.

DESCRIPTION OF THE PREFERRED EMBODIMENT

Figure 1:
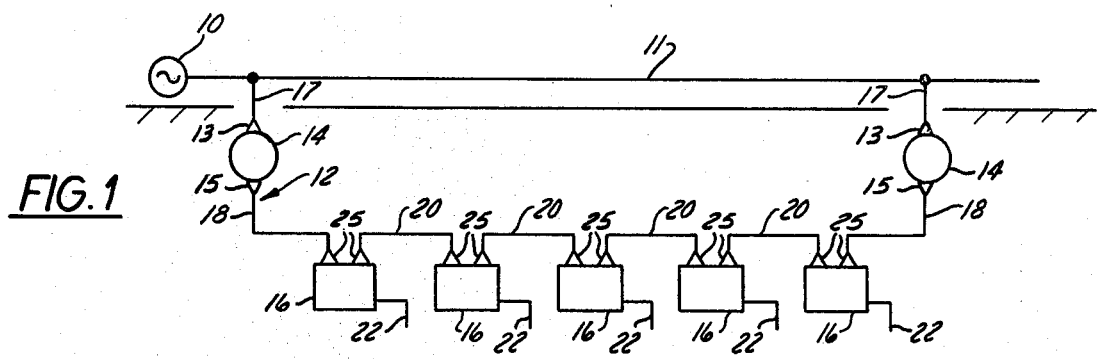

FIG. 1 shows an AC electrical power distribution system in accordance with the invention. The system is shown as single phase but it is to be understood that the invention is also applicable to multi-phase systems. The system shown comprises a source 10 of AC electrical power, such as a substation, a feeder line 11, and a closed loop underground electric power distribution circuit 12 energizable at both ends from line 11. Circuit 12 includes a pair of reclosers 14, a plurality of transformer assemblies 16 connected between the reclosers and shielded cable sections 18 and 20. The reclosers 14 and transformer assemblies 16 are located in accessible underground vaults (not shown) and the cable sections 18 and 20 are buried in the earth and terminate in the vaults. One bushing 13 of each recloser 14 is connected to feeder line 11 by a conductor 17. The other bushing 15 of each recloser 14 is connected by shielded cable section 18 to a primary bushing 25 of the next adjacent transformer assembly 16. The primary bushings 25 of adjacent transformer assemblies 16 are connected to one another by shielded cable sections 20. Each transformer assembly is provided with a customer power supply line 22. During normal operation, AC source 10 and feeder line 11 are energized and the reclosers 14 are closed and supply power to all of the transformer assemblies 16 which, in turn, energize the customer supply lines 22.

Figure 2:
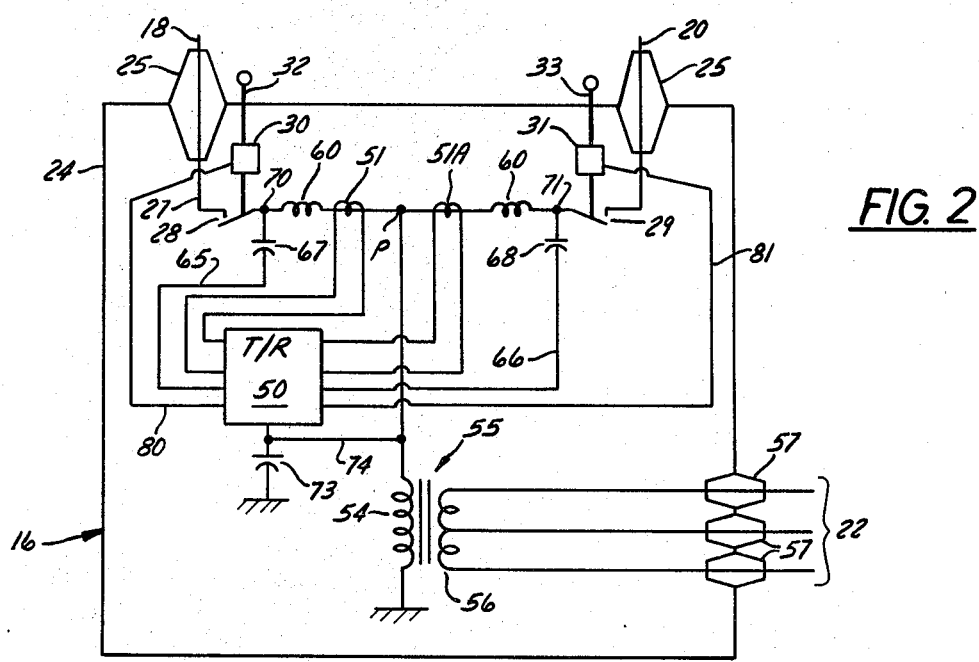
FIG. 2 is an enlarged schematic diagram of one of the transformer assemblies shown in FIG. 1.

FIG. 2 shows the construction of a transformer assembly 16. Transformer assembly 16 comprises a housing 24 which is provided with a pair of spaced conventional primary insulating bushings 25 to which shielded cable sections 18 or 20 are connectable. The conductive portions of the pair of bushings 25 are series connected inside housing 24 by conductor 27 in which conventional "dead break" isolating switches 28 and 29, shown in open condition, are located in series circuit. The isolating switches 28 and 29 are provided with "armable" and manually resettable isolating means in the form of switch actuators 30 and 31, respectively. The switch actuators 30 and 31 are provided with indicating means in the form of resettable indicating handles 32 and 33, respectively, which extend outwardly of housing 24 into the vault (not shown).

Figure 4:
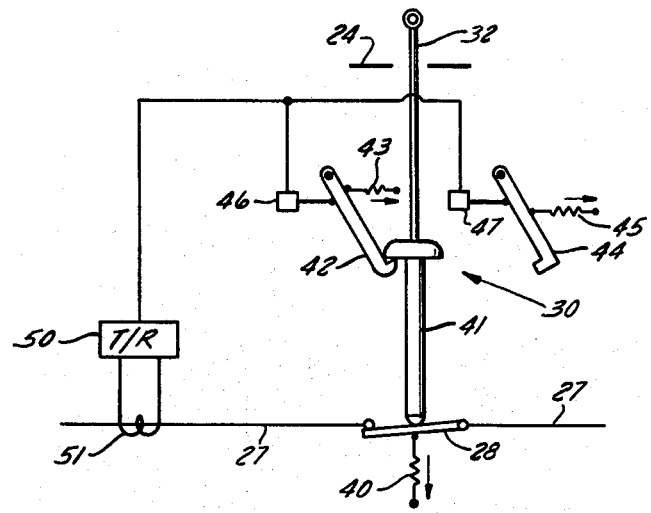
FIG. 4 is an enlarged schematic diagram of an isolator switch and actuator therefor showing the isolator switch closed and the actuator unarmed (NORMAL)
Figure 5:
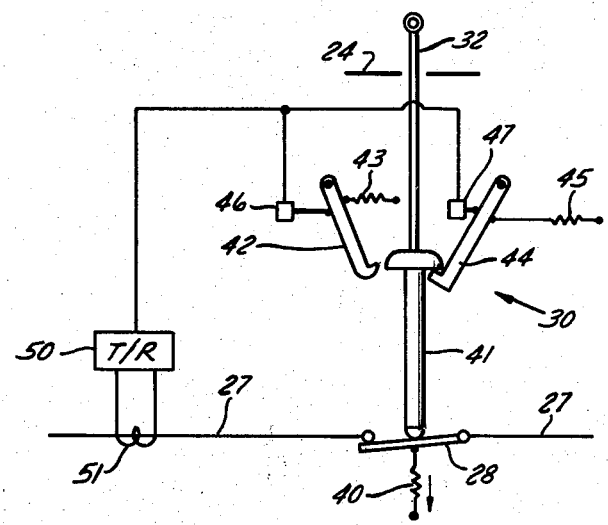
FIG. 5 is a diagram similar to FIG. 4 but showing the isolator switch closed and the actuator armed (FAULT, ARMED)
Figure 6:
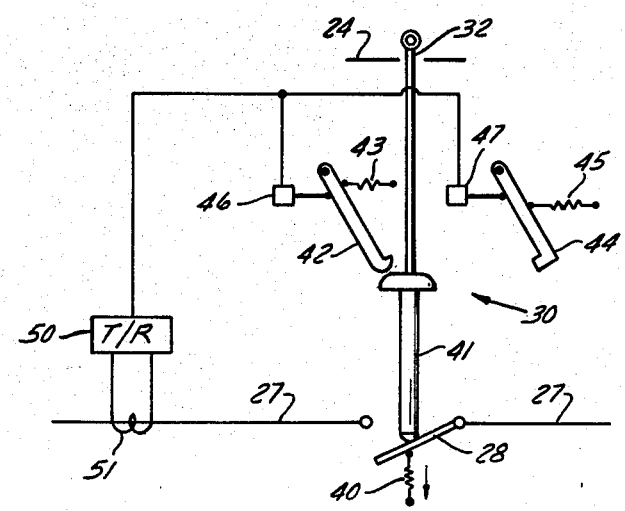
FIG. 6 is a diagram similar to FIG. 4 but showing the isolator switch open and the actuator tripped (TRIPPED OPEN)

FIGS. 4, 5 and 6 show the construction and mode of operation of isolating switch 28 and its armable isolating switch actuator 30. It is to be understood that, since the switch 29 and actuator 31 are identical in construction and mode of operation, only switch 28 and actuator 30 are hereinafter described in detail. FIG. 4 shows switch 28 normally closed and actuator 30 unarmed. FIG. 5 shows switch 28 closed but actuator 30 armed. FIG. 6 shows switch 28 open and actuator 30 tripped and ready to be manually reset.

Switch 28 is pivotably movable from the closed position shown in FIGS. 4 and 5 to the open position shown in FIG. 6 under the biasing action of a tension spring 40. Switch 28 is mechanically connected to (but electrically insulated from) a T-shaped actuator member 41 to which, in turn, the resettable indicating handle 32 is mechanically connected.

Figure 4A:
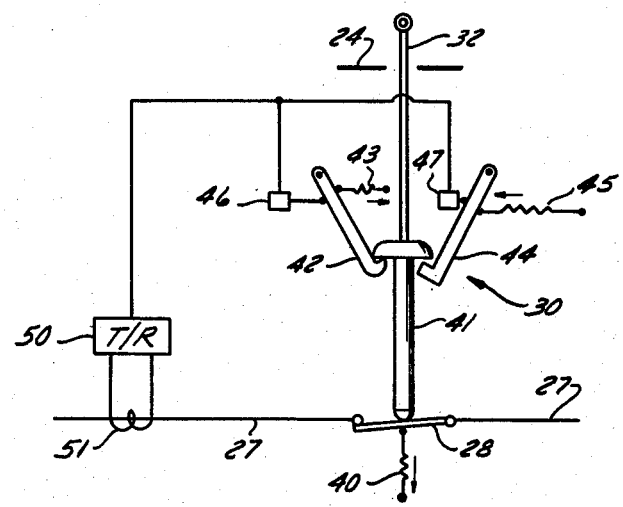
FIG. 4A is a diagram similar to FIG. 4 showing the isolator switch closed under a fault current and the actuator unarmed (FAULT, NOT ARMED)

As FIG. 4 shows, actuator member 41 is normally latched in upward switch-closed unarmed position by means of a first L-shaped latch member 42 which is normally biased into latching engagement therewith by means of a tension spring 43. A second L-shaped latch member 44 is normally biased out of latching engagement and away from actuator member 41 by means of a tension spring 45. In this condition, the solenoid coils 46 and 47 which are mechanically connected to the latch member 42 and 44, respectively, are both de-energized. A high frequency transmitter/receiver 50 is coupled to the cable 27 by means of a current transformer receiver 51 as described hereinafter. When a fault condition exists in the system, solenoid coil 47 is energized and second latch member 44 engages actuator member 41 assuring that switch 28 will never open while fault current is flowing. This condition is shown in FIG. 4A.

As FIG. 5 shows, when T/R 50 determines that a fault exists in the adjacent cable section, solenoid coil 46 is energized and the first L-shaped latch member 42 is biased out of latching engagement and away from actuator member 41. Actuator member 41 moves a short distance until it is restrained by latch 44, at which position latch 42 will not re-engage member 41 when solenoid coil 46 is de-energized. The solenoids 46 and 47 are energized in timed sequence so that member 42 does not disengage until after member 44 is engaged. The solenoid coils 46 and 47 are both energized to arm the actuator 30 only when a fault current of predetermined magnitude flows in cable 27 and transmitter/receiver unit 50 determines that the fault is in the adjacent cable section.

As FIG. 6 shows, when reclosers 14 interrupt the fault current and de-energize the system, solenoid coil 47 is de-energized and spring 45 disengages latch 44. Actuator member 41 then moves downward to switch-open tripped position under the biasing action of spring 40. The isolating switches 28 and 29 can be manually reset by an upward pull on the downwardly disposed handles 32 and 33, respectively.

Referring to FIG. 2, it is seen that a point P in conductor 27 between the isolating switches 28 and 29 is connected to one side of a primary winding 54 of a transformer 55 in housing 24 of transformer assembly 16. The other side of primary winding 54 is grounded. A secondary winding 56 of transformer 55 is connected to the customer power supply line 22 through suitable secondary bushings 57.

Means are provided in series circuit with the specific cable sections 18 and 20 to restrict the T/R unit high frequency control signals to the corresponding cable sections. Such means is in the form of traps 60, each in the form of an inductance coil which permits passage there through of normal AC current and fault current but whose inductance is high enough to prevent passage of electric signals of a predetermined high frequency. Two traps 60 are provided in each transformer assembly 16 and in effect divide the loop circuit 12 into the individual cable sections 18 and 20. Each cable section 18 and 20 is then individually tested, to determine if the fault originates therein. The faulted section can then be sectionalized, isolated, or removed from the loop circuit 12 by opening of the appropriate isolating switches 28, 29 in the transformer assemblies. Each trap or coil 60 is located between point P in conductor 27 and an isolating switch 28 or 29. Thus, there is a trap 60 near each end of the underground cable sections 18 and 20.

Means are provided in each transformer assembly 16 to transmit and receive a high frequency control signal to its adjacent cable sections. Such means is in the form of the high frequency transmitter/receiver (or T/R) units 50 which when in operation are adapted to send or receive high frequency signal (on the order of 20 MHz) through signal lines 65 and 66 and through coupling capacitors 67 and 68, respectively, to the conductor 27. More specifically, signal line 65 connects through capacitor 67 to a point 70 between one trap 60 and isolating switch 28. Signal line 66 connects through capacitor 68 to a point 71 between the other trap 60 and isolating switch 29. The T/R unit 50 has its other side connected to high frequency ground through a grounding capacitor 73 bypassing transformer primary winding 54 of transformer 55. In some installations the shunt capacitance in transformer 55 may suffice for this function.

The T/R unit 50 is provided with a pair of current transformers 51 and 51A, each of which is coupled to cable 27 between a trap 60 and point P. Each current transformer 51, 51A functions to supply operating power for T/R unit 50, to sense and indicate the magnitude of the line current in that portion of conductor 27 to which it is coupled, and to sense and indicate the phase of such line current.

The T/R unit 50 is provided with a pair of control lines 80 and 81 which are connected to isolating switch actuators 30 and 31, respectively, and in particular to the hereinbefore described solenoids 46 and 47 in each isolating switch actuator.

Figure 3:
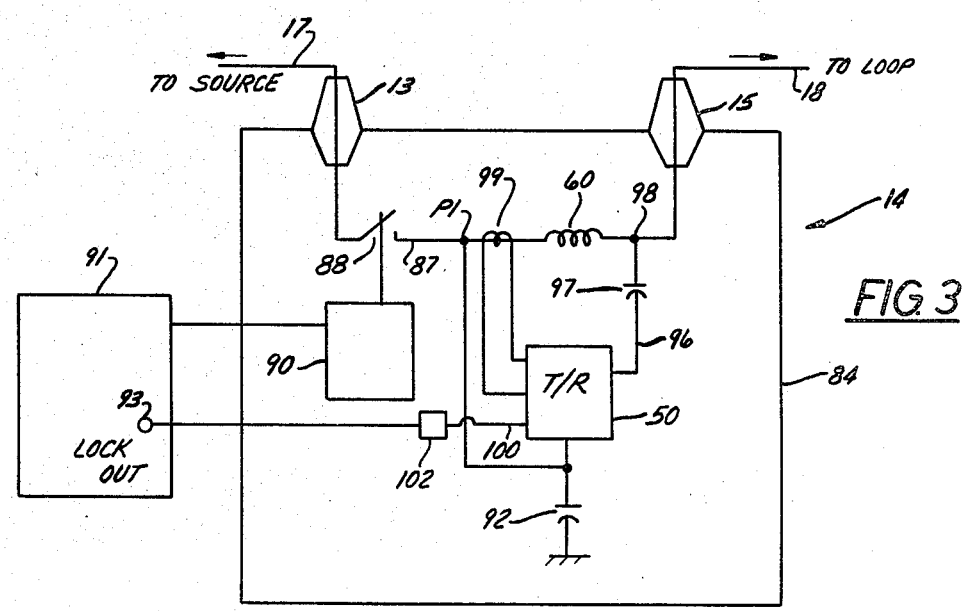
FIG. 3 is an enlarged schematic diagram of one of the reclosers shown in FIG. 1.

FIG. 3 shows the construction of the recloser 14. Recloser 14 comprises a housing 84 which is provided with the hereinbefore mentioned pair of bushings 13 and 15 to which the cable 17 and the shielded underground cable 18, respectively, are connected. The conductive portions of the bushings 13 and 15 are series connected inside housing 84 by a conductor 87 in which a recloser switch 88, shown in open condition, is located. Recloser switch 88 is provided with a recloser switch actuator 90 which is operated or controlled by a recloser control 91 which may be located exteriorly of housing 84. Recloser control 91 maintains actuator 90 in such condition as to maintain recloser switch 88 normally closed. Recloser control 91 is responsive to a fault current in loop circuit 12 to operate actuator 90 to effect opening of a recloser switch 88 in approximately two cycles in the event of a fault and to effect reclosure of switch 88 after a short predetermined interval of time (i.e., on the order of two seconds). If the fault remains, recloser control 91 again affects operation of actuator 90 and switch 88. Recloser control 91 is provided with a lock-out means or device 93, hereinafter described, which operates to prevent reclosure of switch 88 in the event that a fault condition exists in cable 18. A point P1 in conductor 87 is connected to high frequency ground through a grounding capacitor 92. Conductor 87 has in series circuit therewith a trap 60 which is similar in form and function to that hereinbefore described in connection with the transformer assembly 16.

FIG. 3 further shows that recloser 14 includes a high frequency transmitter/receiver unit 50, similar to that hereinbefore described, which transmits and receives a high frequency signal through its signal line 96 and through a coupling capacitor 97 to a point 98 between trap 60 and the bushing 15 on cable 97. The T/R unit 50 of recloser 14 has its other side connected to high frequency ground through grounding capacitor 92 to provide a return path for high frequency signals. The T/R unit 50 of recloser 14 is provided with a current transformer 99 which is coupled to conductor 87 between point P1 and trap 60 to supply operating power for the T/R unit. The T/R unit 50 of recloser 14 is provided with a control line 100 which is connected through an isolator 102 to the lock-out means or device 93 in recloser control 91. The isolator 102 provides high voltage isolation for the lock-out signal from the T/R unit to the recloser control 91.

OPERATION

Figure 7:
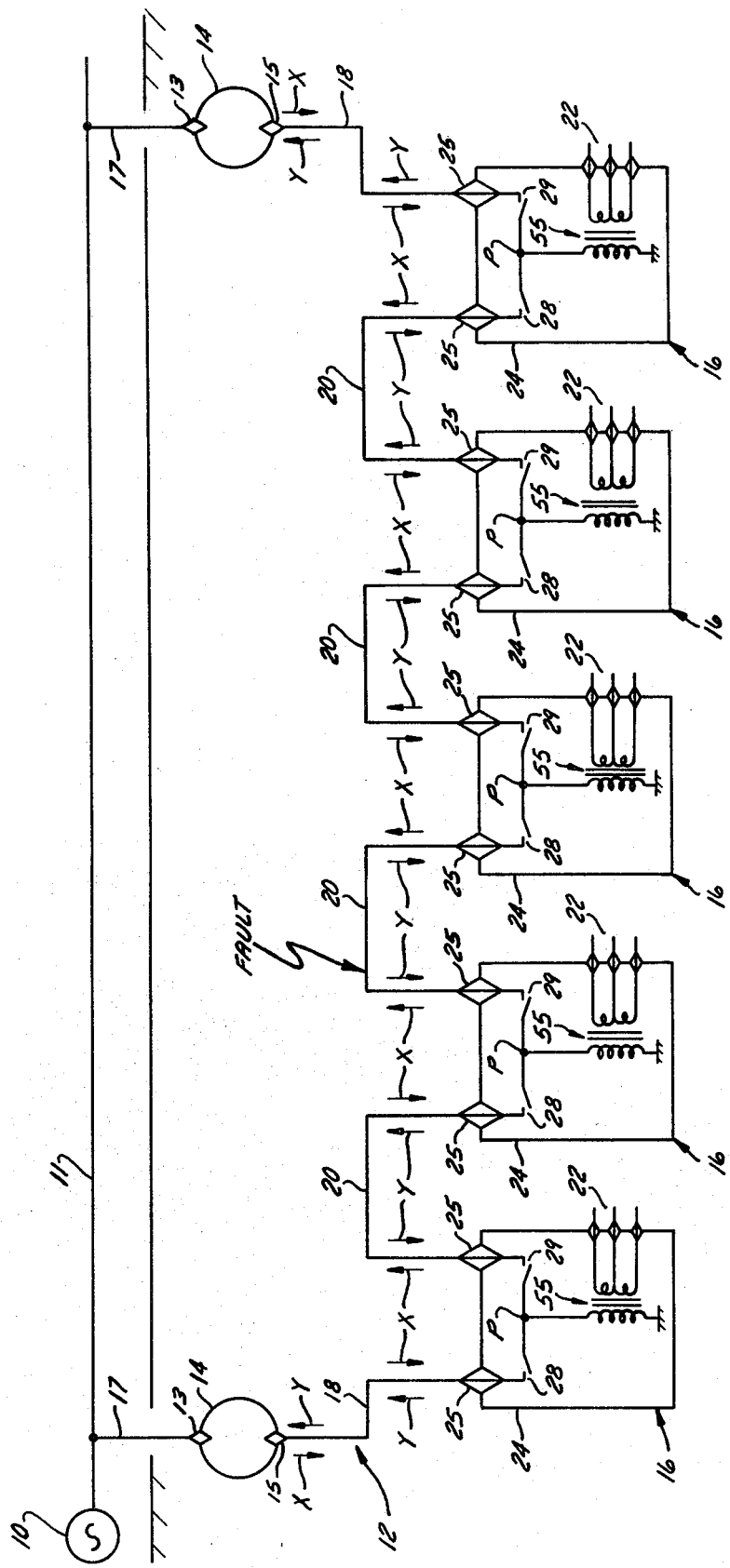
FIG. 7 is a schematic diagram similar to FIG. 1 but depicting current flow conditions therein during a typical fault condition.

Referring to FIG. 7, the arrows designated X show current flow during the first halb-cycle of fault current. The arrows designated Y show current flow during the second half-cycle of fault current. Assume that a fault occurs in loop 12 in the cable section 20 between two transformer assemblies 16 as indicated on the drawing. Fault current is fed through the reclosers 14 at both ends of the loop and through all transformer assemblies 16. The reclosers 14 are of the type that normally function to open the loop in approximately two cycles. The switch actuators 30, 31 on the switches on each end of the faulted cable section are "armed" during the two cycles of fault current operation and open their related isolator switches immediately after the reclosures open the loop, as explained hereinafter. The reclosures 14 normally reclose after a predetermined time interval of approximately two seconds.

The current transformers 51, 51A, and 99 power the T/R units 50 in the transformer assemblies 15 and the reclosers 14 providing magnitude and phase information of the fault current. Each T/R unit 50 as soon as it recognizes that the current is of fault magnitude begins to transmit and receive high frequency control signals to and from the adjacent cable sections. The T/R unit 50 transmitter in each transformer assembly 16 applies a high frequency signal to the adjacent cable sections 18, 20 for which instantaneous current is flowing "into" a transformer primary bushing 25, 15. The T/R unit 50 receiver listens for the high frequency signal from the adjacent cable section 18, 20 to which instantaneous current is flowing "out of" a bushing 25, 15.

When current direction reverses at the end of the half-cycle, the T/R unit 50 transmitters and receivers switch to the opposite cable sections so that high frequency is always applied to the side from which instantaneous current is flowing "into" the bushing and the receiver is always listening at the side to which instantaneous current is flowing "out of" the bushing.

If the T/R unit 50 receiver hears a high frequency signal while fault current is flowing, it recognizes that the adjacent cable section is not faulted, and no action is taken.

If the T/R unit receiver does not hear a high frequency signal from the adjacent cable section, it recognizes that the adjacent cable section is faulted.

Since instantaneous fault current flow, as seen in FIG. 7, under fault conditions will be "out of" the bushings 25 at both ends of the faulted cable section 20 during the first half-cycle (indicated by "x") neither end has a high frequency signal being applied. During the second half-cycle (indicated by "y") instantaneous fault current flow will be "into" the bushings 25 at both ends of the faulted cable section 20, and neither associated T/R 50 will be listening. Thus, neither T/R will hear a signal through the faulted cable section, and the fault is identified as being in that cable section. The T/R unit 50 then "arms" the isolating switch actuators 30, 31 for the isolating switches 28 or 29 on both sides of the faulted cable section 20.

At the end of about two cycles of fault current flow, both recloser switches 88 open and, upon disappearance of the fault current in the loop circuit, the isolating switch actuators 30, 31 which have been "armed" (see FIG. 5) permit their associated isolating switches 28, 29 to open (see FIG. 6). Since the only actuators 30, 31 that have been "armed" are those at the ends of the faulted cable section 20, that cable section is disconnected or sectionalized from the loop.

After approximately two seconds, both reclosers reclose, restoring service to all transformer assemblies 16 as seen in the example shown in FIG. 7. However, the transformer assemblies 16 on each side of the fault are now energized from only one end of the loop 12 through one recloser 14.

The position of the indicating handles 32, 33 for the open isolating switches 28, 29 give a clear indication of which cable section experienced the fault, i.e., that section between two tripped handles. Indicating lights (not shown) or other alarms (not shown) can also be activated by the indicating handles.

If the faulted cable section is adjacent to a recloser 14, the action is similar except that the recloser T/R unit 50 gives a "lock-out" command to recloser control 91 in the same manner that a transformer assembly T/R unit 50 gives an "arm" command to an actuator 30, 31.

It may not be economical to supply sectionalizing apparatus for each transformer in a long loop. However, if the apparatus is installed at every second transformer, one transformer will be left de-energized after a cable fault. Similarly, if an apparatus is installed at every third transformer, two transformers will be left de-energized after a cable fault.

Both reclosers 14 will operate each time there is a cable fault. Recloser operation can be monitored to indicate when a fault has occurred and a cable section is out of service.

The invention has hereinbefore described in connection with a closed loop circuit 12 which is fed from a single AC source 10. Some utility operating practices demand that loop circuits be operated "open", such as when the two loop ends are fed from different sources or substations. The present invention is applicable to such "open" loop systems, if the "open" point of the loop is equipped with a "loop tie switch" (not shown) which will close when voltage is lost on either side. In this case the T/R unit 50 nearest the fault on the source side will open following the recloser 14 opening; since it received no high frequency signal from the next transformer T/R unit 50 because the next transformer assembly 16 has not passed the fault current. Upon closing of the loop tie switch (not shown) the isolating switch 28, 29 at the other end of the faulted cable section will be opened in the manner hereinbefore described.

It is to be understood that high frequency signals may be blocked in the faulted cable section by the fault itself. This is harmless, since the T/R units 50 at the ends of the faulted cable section transmit simultaneously, and neither receiver is listening during the half-cycle when the fault is obliterating the signal. Thus, the basic "trip" indication is lack of a signal when a receiver is listening.

It should also be noted that a fault inside a transformer 55 in a transformer assembly 16 will cause both transformer primary bushings 25 to see current "into" them simultaneously or "out of" them simultaneously. This indication may be used to disable the transmitter of the T/R unit 50 so that the isolating switches at the far ends of both adjacent cable sections will "arm" and open. Disabling of the transmitter of the T/R unit 50 may also be used to "arm" both isolating switches 28, 29 in the faulted transformer assembly 16 for subsequent disconnection.

The embodiments of the invention in which an exclusive property or privilege is claimed, are defined as follows:

1. In an underground shielded cable electric power distribution loop circuit having a pair of recloser switches connected in series in said loop circuit and electrical apparatus connected to said shielded cable between said recloser switches; a high frequency fault indicating isolating system, said system comprising a number of normally closed isolating switches connected in series in said shielded cable, means responsive to a fault current for arming those isolating switches between which a fault occurs, actuating means operatively connected to open only the isolating switches which have been armed, signal generating means responsive to a fault current in said loop circuit to apply high frequency control signals to said cable, said signal generating means responding to the absence at a predetermined time of the high frequency control signal from the faulted section of the cable to operate the actuating means to open the isolating switches which have been armed, after the recloser opens.

2. The system according to claim 1 wherein said signal generating means comprises a high frequency transmitter/receiver unit operatively connected to each of the transformer assemblies and the recloser switches.

3. The system according to claim 2 wherein said signal generating means includes high frequency trap means connected in series in the cable to restrict the high frequency control signals of each transmitter/receiver unit to the adjacent cable sections.

4. The system according to claim 1, 2 or 3 wherein said actuating means includes an actuator for each isolating switch and wherein each actuator includes first latch means for "arming" the isolating switch in response to an adjacent fault and a second latch means to release the isolating switch after the recloser opens.

5. In an underground electric power distribution loop circuit energizable at opposite ends; a shielded cable, a recloser switch at each end of said cable, and a plurality of electrical devices connected to said loop circuit at points between said recloser switches and normally energizable through both recloser switches; a fault isolating system comprising: a plurality of normally closed isolating switches connected in series in said cable to define cable sections between the recloser switches and the electrical devices, signal generating means responsive to a fault current in said cable to apply high frequency control signals to said cable, means responsive to a fault current for arming said isolating switches between which there is a faulted cable section, and actuating means connected to respond to said signal generating means to open only the armed isolating switches to isolate said faulted cable section, whereby upon subsequent reclosing of said recloser switches, said electrical devices, if not connected between the open isolating switches are each energizable through only one recloser switch.

6. The system according to claim 5 wherein said signal generating means includes a transmitter/receiver unit in each electrical device for applying high frequency electric control signals through the cable sections.

7. The system according to claim 6 including high frequency trap means connected in said system for restricting passage of high frequency electric control signals to said cable sections.

8. The system according to claim 5, 6 or 7 wherein said isolating switches include signalling means for visually locating the open isolating switches.

9. In an underground electrical power distribution loop circuit energizable at opposite ends and including a pair of recloser switches connected in series in said loop circuit; a plurality of shielded cable sections connected in series in said loop circuit; and a plurality of transformer assemblies connected to said loop circuit and being energizable through both recloser switches, each cable section being connected between a recloser switch and an adjacent transformer assembly or between a pair of adjacent transformer assemblies;

a fault isolating system comprising normally closed isolating switches connected in series in said loop circuit at the ends of the cable sections;

and high frequency means responsive to a fault current in the loop circuit to transmit high frequency control signals through said cable sections, switch actuator means connected to open said isolator switches, said actuator means being connected to said high frequency means to arm the isolator switches at opposite ends of the faulted cable section in response to a signal from said high frequency means, said armed isolator switches opening after said recloser switches open, said high frequency means being further operable in the event said faulted cable section is between a recloser switch and an adjacent transformer assembly to prevent reclosing of the last-recited recloser switch, whereby upon subsequent reclosing of the other recloser switch, each transformer assembly, is energized through said other recloser switch.

10. The system according to claim 9 wherein said high frequency means includes a transmitting and receiving high frequency unit for applying electric control signals through said cable sections of said loop circuit to locate said faulted portion.

11. The system according to claim 10 including high frequency trap means in said loop circuit for limiting passage of said high frequency electric control signals, to said shielded cable sections.

12. In combination:

an underground electric power distribution loop circuit energizable at opposite ends;

the loop circuit including a plurality of shielded cable sections;

a pair of recloser switches connected in series in said loop circuit;

a plurality of transformers connected to said loop circuit at points between said recloser switches, said transformers normally being energizable through both recloser switches; a plurality of isolating switches connected in series in said loop circuit between said pair of recloser switches, said isolating switches being disposed so that there is a pair of isolating switches in each cable section between each pair of adjacent transformer connection points and one isolating switch in the cable section between each recloser switch and the next adjacent transformer connection point;

and high frequency generating means connected to respond to a fault current in the loop circuit and to open those isolating switches located in the cable section where the fault is sensed, said high frequency generating means being further operable to open one of said isolating switches and to prevent reclosure of one of said recloser switches in the event said faulted section is located there between, such switch opening and prevention of reclosure occurring after said reclosure switches open, to thereby disconnect said faulted cable section whereby upon subsequent reclosing of at least one of said recloser switches, each transformer is energizable through only one recloser switch, provided such transformer is not connected to any faulted cable section between a pair of open switches.

13. The combination according to claim 12 wherein said high frequency means includes at least one means for alternately transmitting and receiving high frequency electric signals through different cable sections of said loop circuit.

14. The combination according to claim 13 including a plurality of high frequency trap means in said loop circuit for blocking passage of said high frequency electric signals to said different cable sections, one of said trap means being located between each transformer connection point and an isolating switch and one trap means being located between a recloser switch and the next adjacent isolator switch.

15. Apparatus for locating and isolating a faulted portion of a shielded cable loop circuit which includes a pair of series connected normally closed recloser switches and a plurality of series-connected normally closed isolator switches between said pair of recloser switches, said apparatus comprising:

means operable in response to a fault current for transmitting a high frequency control signal through different portions of said cable; latch means responsive to said transmitting means for arming said isolator switches between which a fault occurs; actuating means connected to said transmitting means for operating only those isolator switches that have been armed; to isolate said faulted portion after said recloser switches open; said transmitting means being responsive to the absence of a control signal on one of the portions of the cable to operate the actuating means, and means for providing an indication of which of said actuator switches have been operated after at least one of said recloser switches recloses.

16. The apparatus according to claim 15 wherein said means for transmitting said high frequency electric signals through different portions of said cable comprises a transmitter and a receiver coupled to each end of said cable portion of said loop circuit.

17. The apparatus according to claim 16 including high frequency trap means for restricting the control signal to said different cable portions.

18. The apparatus according to claim 15, 16 or 17 wherein said actuating means comprises an isolator switch actuator connected to each isolator switch.

19. The apparatus according to claim 18 wherein said latch means includes a first latch member engageable with said isolator switch to maintain said isolator switch in open unarmed condition, a second latch member engageable with said isolator switch to maintain said isolator switch in open armed condition, and solenoid means operable in response to the occurrence of a fault to effect engagement of said second latch member with said actuator member before disengagement of said first latch member, said solenoid means being further operable in response to opening of said recloser switches and removal of said fault current from said loop circuit to effect disengagement of said second latch member from said actuator member to thereby cause said isolator switch to open.

20. The apparatus according to claim 15, including means for manually reclosing each of said isolator switches which opens in response to a fault, said last-recited means being associated with said means for providing an indication of which of said switches have been operated.

* * * * *